United States Patent [19]
Czerny et al.

[11] Patent Number: 5,460,730
[45] Date of Patent: Oct. 24, 1995

[54] PROCESS AND APPARATUS FOR TREATING WASTEWATER FROM LEAD BATTERY PRODUCTION

[75] Inventors: Thomas Czerny, Glashütten; Rainer Jostes, Hattersheim, both of Germany

[73] Assignee: Varta Batterie Aktiengesellschaft, Hannover, Germany

[21] Appl. No.: 268,163

[22] Filed: Jun. 27, 1994

[30] Foreign Application Priority Data

Jul. 8, 1993 [DE] Germany .................. 43 22 781.3

[51] Int. Cl.$^6$ ............................................. C02F 1/66
[52] U.S. Cl. .................. 210/710; 210/712; 210/713; 210/724; 423/95; 423/559
[58] Field of Search .................. 423/95, 92, 559; 210/912, 724, 712, 713, 710

[56] References Cited

U.S. PATENT DOCUMENTS

| | | | |
|---|---|---|---|
| 2,219,404 | 10/1940 | Simpson | 423/559 |
| 3,194,685 | 7/1965 | Malloy | 423/559 |
| 4,024,055 | 5/1977 | Blahn | 423/559 |
| 4,118,219 | 10/1978 | Elmore et al. | 423/559 |
| 4,310,421 | 1/1982 | West et al. | |
| 4,927,510 | 5/1990 | Olper et al. | 423/559 |
| 5,252,105 | 10/1993 | Witherspoon et al. | 423/559 |
| 5,314,766 | 5/1994 | Witherspoon et al. | 423/559 |

FOREIGN PATENT DOCUMENTS 0454257 4/1991 European Pat. Off. .

OTHER PUBLICATIONS

ATV Memorandum M752, Abwasser bei der Herstellung von elektrischen Akkumulatoren und Primarzellen (Wastewater in the Production of Electric Batteries and Primary Cells), Gesellschaft zur Forderung der Abwassertechnik e.V., St. Augustin, 1992.

L. Hartinger, Handbuch der Abwasser und Recyclingtechnik fur die metallverarbeitende Industrie (Wastewater and Recycling Techniques Handbook for the Metal Processing Industry), Carl Hanser Verlag, Munich, Vienna, 1991.

D. Berndt, Maintenance–Free Batteries, A Handbook of Battery Technology, pp. 183–184, Research Studies Press Ltd., Taunton, Somerset, England, 1992.

*Primary Examiner*—Neil McCarthy
*Attorney, Agent, or Firm*—Weiser & Associates

[57] ABSTRACT

Lead oxide is used for neutralizing the sulfuric acid wastewater received from washing charged (formed) electrodes during lead battery production. The neutralization product, including lead sulfate and excess lead oxide, is returned directly to production of the active mass paste. The mother liquor, after a possible use as cleaning water, is subjected to another neutralization with lead oxide, separate from the wastewater received from the electrode washing procedure in view of its possible content of impurities. The resulting lead sulfate is sent to a metal-processing facility for recycling. The neutral mother liquor, after the removal of lead residues by conventional precipitation methods and filtration, is discharged as treated water.

13 Claims, 1 Drawing Sheet

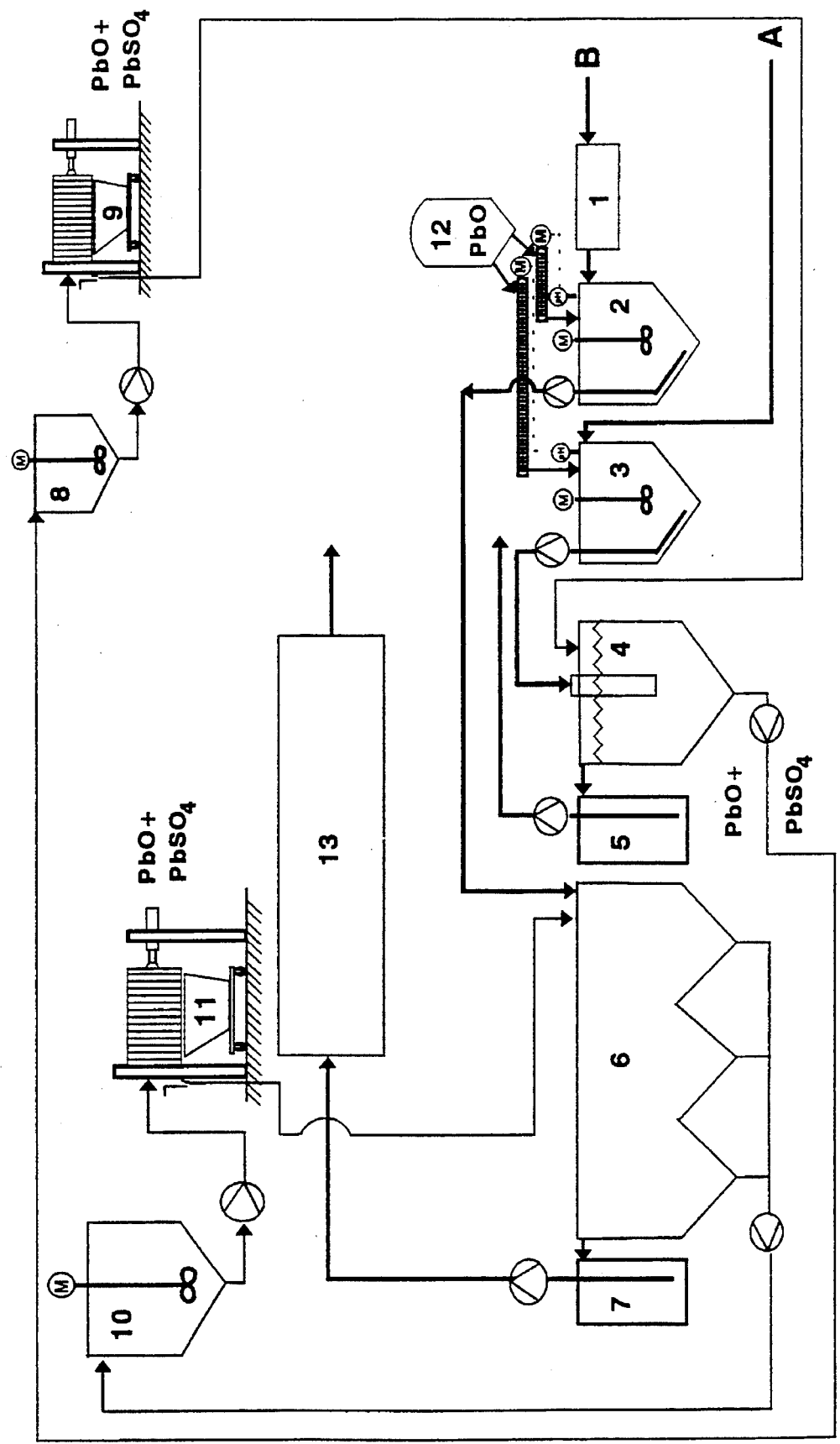

PROCESS AND APPARATUS FOR TREATING WASTEWATER FROM LEAD BATTERY PRODUCTION

BACKGROUND OF THE INVENTION

The present invention relates to a process for treating wastewater from lead battery production, and an apparatus for implementing such a process.

Ordinarily, initial charging of the electrodes of a lead battery (which is generally referred to as "formation") is followed by a rinsing process, usually as part of the last wet treatment of the battery production process. At this stage, it is desirable to remove essentially all of the formation acid from the pores of the plates. This washing (with flowing clean water) can be performed on the individual electrodes, before their installation, or in a blocking box, as a group.

The wastewater which is accumulated at this point is contaminated with about 25 g of $H_2SO_4$/l. Such acid wastewater is usually then treated by a two-step neutralization. Milk of lime, caustic soda or sodium carbonate are commonly used as the neutralizing agents.

In the case of precipitation with milk of lime, gypsum is produced which is contaminated with lead and which must therefore be given special handling (as a hazardous waste). High sulfate contents in the wastewater are brought to a concentration corresponding to the solubility of the calcium sulfate. At higher sulfate contents, this lies between 1400 mg/l and 2000 mg/l (approximately). However, because of the risk of concrete corrosion, many governmental authorities require a limit for sulfates in wastewater of between 400 mg/l and 600 mg/l.

Since these values cannot be achieved with a milk of lime process, various, more effective procedures have been proposed. For example, the additional use of calcium aluminate to produce a sulfate precipitation which goes beyond the milk of lime neutralization is suggested in ATV Memorandum M752 (Abwässer bei der Herstellung von elektrischen Akkumulatoren und Primärzellen [Wastewater in the Production of Electric Batteries and Primary Cells], Gesellschaft zur Förderung der Abwassertechnik e.V., St. Augustin, 1992). As the reaction product, this process yields calcium-aluminum sulfate (ettringite) as a voluminous sludge or mud, which increases the quantity of wastes from the wastewater treatment. Also described is treatment of the sulfuric acid discarded from formation, with the aid of distillation. This, however, involves very high energy costs.

Another proposal has been to avoid wastewater and waste products; for example, by collecting the acid which is no longer useful for formation, and in order to lower the sulfate content, to make the collected acid once again available for production as a diluted acid. This is suggested by L. Hartinger, Handbuch der Abwässer und Recyclingtechnik für die metallverarbeitende Industrie (Wastewater and Recycling Techniques Handbook for the Metal Processing Industry), Carl Hanser Verlag, Munich, Vienna, 1991). However, even in this way, the low limits desired for sulfates in the wastewater are far from reached.

U.S. Pat. No. 4,310,421 suggests dilution as a means for promoting the reuse of wastewater, primarily for the production of positive electrodes for Ni/Cd batteries. As is known, after impregnation with nickel nitrate, sintered electrodes are treated with hot caustic soda to transform the nitrate into an hydroxide. As disclosed, the spent precipitation liquor (with its content of NaOH and $NaNO_3$, and with a part of its remaining heat) can be reused following treatment in a mixing tank by adding a NaOH solution, with continuous monitoring of its density to a desired concentration, and by then combining the result with fresh precipitation liquor.

EP-OS 454,257 suggests that not only the residual sulfuric acid, but also the sulfuric acid bound to the active masses of used lead batteries, can be transformed into sodium sulfate by reaction with caustic soda and by subjecting the sulfate to an electrolysis in which caustic soda is formed in the cathode space of the electrolysis cell and sulfuric acid is formed in the anode space. After reconcentrating, the sulfuric acid can be used in new batteries. The caustic soda can also be used, again for neutralizing acids and spent lead sulfates.

SUMMARY OF THE INVENTION

It is therefore the principal object of the present invention to significantly reduce the sulfate content of wastewater derived from electrode washing after formation.

It is also an object of the present invention to provide a process for treating wastewater derived from electrode washing after formation which is as economical as possible, and which simultaneously takes into account the requirements of environmental protection.

These and other objects which will become apparent are achieved in accordance with the present invention by providing a process for treating wastewater derived from the production of lead batteries in which the sulfuric acid water accumulated during washing of the charged electrodes is neutralized with lead oxide. The lead sulfate which is formed as a neutralization product is then separated from the mother liquor, together with the excess lead oxide, and is used (reused) for the production of active mass paste. After a possible intermediate use as cleaning water, the mother liquor is subjected to a neutralization treatment with lead oxide, but separate from the acid water derived from the electrode washing. The lead sulfate which is accumulated at this time, in addition to impurities and excess lead oxide, is delivered to a metal-processing facility for lead recycling. After further precipitation treatment and filtration, the neutral mother liquor (from the cleaning water) is discharged as treated water.

The improvements of the present invention result from the fact that lead oxide is used to neutralize the wastewater containing sulfuric acid. As a result, lead sulfate precipitates out which, in addition to excess lead oxide, can be returned (directly) for the production of lead paste. The mother liquor (after a potential intermediate use as cleaning water for machines, floors, and the like) is subjected to a further neutralization (using lead oxide), but separately from the wastewater derived directly from electrode washing. This then precipitates out residues of lead sulfate, which are accompanied by excess lead oxide and foreign substances from the intermediate cleaning step. This effluent is then sent to a metal-processing facility, for conventional lead recycling, and the mother liquor (the cleaning water) is discharged as treated water.

For further detail regarding the improvements of the present invention, reference is made to the detailed description which is provided below, together with a single FIGURE showing a flow chart of a preferred wastewater treatment system.

DETAILED DESCRIPTION OF A PREFERRED EMBODIMENT

Referring to the FIGURE, the treatment of sulfuric acid wastewater (A) received from the electrode washing installation (not shown) begins with neutralization with lead oxide, at 3. The lead oxide is taken from a silo 12 (equipped with a screw conveyer). The reaction mixture is brought to a Dortmund tank 4 where the insoluble neutralization product, lead sulfate, together with excess lead oxide, is separated from the mother liquor by sedimentation.

From the Dortmund tank 4, the lead-containing precipitate is passed through a pump collector 8 and to a filter press 9. The precipitate is then used (reused) for the production of lead mass pastes. The mother liquor from the neutralizing precipitation leaves the Dortmund tank 4 through a pump collector 5.

The mother liquor is first preferably used as cleaning water (e.g., for the floors or machines in the pasting room and the forming room, since these departments must always be kept moist to control dust development). Thereafter, the cleaning water is reintroduced, at (B), and is collected in a raw water collecting pit 1. From there, the collected cleaning water is neutralized with lead oxide, at 2.

It is essential that the neutralizing treatment of the cleaning water (B) be conducted separately from the neutralizing treatment of the acid wastewater (A) received from the electrode washing installation. This is because the latter is practically free of impurities that could be harmful to batteries (a precondition for direct use of the precipitated lead), while the mother liquor includes absorbed foreign substances or impurities (from its use in cleaning the floors).

A residual quantity of lead sulfate precipitated at 2, including excess lead oxide and impurities, is transferred together with the mother liquor to a settling basin 6. A pump collector 10 then passes this effluent to a filter press 11, where it is shunted off for use in lead recycling at a metal-processing facility.

The neutral mother liquor in the settling basin 6 still contains a quantity of lead which corresponds to the solubility of lead sulfate and possibly other ionogenic or colloidally dissolved foreign metals. Although the solubility of $PbSO_4$ in water is only about 40 mg/l, the lead content of the mother liquor is still far too high to be released into a receiving stream. To remove this residual lead, a pump collector 7 is provided to feed the mother liquor to a station, at 13, where the mother liquor is subjected to an appropriate conventional treatment for lead-containing wastewater. Most known treatments are directed to precipitating the lead by adding anions to form a lead salt whose solubility is lower than that of lead sulfate, and can be used for such purposes. Favorable precipitation reagents are phosphoric acid or water-soluble phosphates, especially in the presence of a flocculating agent such as $FeCl_3$ and additions of a flocculation aid. Again, caustic soda is used to adjust the optimal pH for the precipitation in the alkaline range. Station 13 also preferably contains a clarification tank, followed by a gravel filter and, at its exit, an apparatus for monitoring (sampling) pH.

The resulting water is now purified to a point where unobjectionable quantities of sulfate, which are essentially free of lead, can be discharged from the plant without violating environmental regulations. A significant advantage of the process of the present invention is that by choosing lead oxide as the precipitating and neutralizing agent for the sulfuric acid wastewater received from the electrode washing process, a material is introduced into the treatment which is already a component of active lead masses and which can therefore be returned directly to the manufacturing process.

The above-described treatments may be accomplished with lead oxide in any of a variety of available forms. This could include the use of substantially pure lead oxide, PbO. However, other electroactive materials which are more readily available can also be used if desired. This would include the use of so-called "lead dust", in either of its prevalent forms, including particles with a nucleus of lead and a surface of lead oxide (e.g., a Barton process) and particles of lead oxide mixed with metallic lead (e.g., a milling process).

The resulting lead sulfate can be derived in any of a variety of useful forms, as well. For example, a preferred material that can be derived, and which is used (or made) in the active mass paste of lead acid batteries, is the so-called "tribasic lead sulfate", $3PbO \cdot PbSO_4 \cdot H_2O$. Using an appropriate ratio of sulfuric acid wastewater and lead oxide, the lead sulfate can be obtained in the form of tribasic lead sulfate according to the stoichiometry of the reaction:

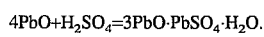

$$4PbO + H_2SO_4 = 3PbO \cdot PbSO_4 \cdot H_2O.$$

The so-called "tetrabasic lead sulfate", $4PbO \cdot PbSO_4 \cdot H_2O$, can also be derived if desired. The following Example is provided to illustrate the foregoing.

Example

1000 L of a wastewater (containing 22.8 kg $H_2SO_4$=233 Mol) were reacted with 260.0 kg of lead dust (containing 80% PbO, corresponding to 208.0 kg PbO=932 Mol). A corresponding amount of lead was provided to an excess of 0.5%. In the course of the reaction, the pH of the wastewater changed from 1.28 to 8.85. Approximately 390 kg of wet precipitate were obtained and subsequently mixed with appropriate amounts of additional PbO, water, and usual additives to obtain a desired active mass paste.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A process for the treatment of sulfuric acid wastewater accumulated during washing of charged electrodes, whereby a plurality of products, including active lead mass paste, processed effluent suitable for lead recycling and purified water, are separately obtained, the process comprising the steps of neutralizing the sulfuric acid wastewater with an excess of lead oxide, thereby forming a neutralized precipitate of a tribasic or tetrabasic lead sulfate and excess lead oxide in an alkaline mother liquor, separating the lead sulfate together with the excess lead oxide, from the alkaline mother liquor and collecting the lead sulfate and the excess lead oxide as a mixture, as a first product, for production of an active lead mass paste, neutralizing the alkaline mother liquor with lead oxide, the step of neutralizing the mother liquor being conducted separate from, but, concurrent with, the step of neutralizing the sulfuric acid wastewater, thereby obtaining a neutralized mother liquor and effluent product, separating the neutralized mother liquor from the effluent product, processing the effluent product to obtain a mixture of lead sulfate and lead oxide, as a second product, while subjecting the neutralized mother liquor to a precipitation to obtain purified water, as a third product, thereby obtaining the plurality of products including, the active lead mass paste, the mixture of lead sulfate and lead oxide, and the purified water.

2. The process of claim 1 comprising the step of utilizing the alkaline mother liquor as cleaning water prior to the step of neutralizing the alkaline mother liquor with lead oxide.

3. The process of claim 2 wherein the effluent product includes lead sulfate precipitate, lead oxide and impurities.

4. The process of claim 3 including the step of removing the impurities from the effluent product.

5. The process of claim 4 wherein the step of processing the effluent includes lead recycling at a metal processing facility.

6. The process of claim 1 wherein the lead oxide of the neutralizing steps is substantially pure PbO.

7. The process of claim 1 wherein the lead oxide of the neutralizing steps is an electroactive material including PbO.

8. The process of claim 7 wherein the electroactive material is lead dust.

9. The process of claim 1 wherein the precipitation is performed with a reagent selected from the group consisting of phosphoric acid and water-soluble phosphates.

10. The process of claim 9 wherein the precipitation occurs in the presence of flocculating agents.

11. The process of claim 10 which further includes the step of filtering the precipitated, neutralized mother liquor prior to discharge as purified water.

12. The process of claim 1 wherein the step of neutralizing the sulfuric acid wastewater with lead oxide causes an upward adjustment of the mother liquor into the alkaline range.

13. The process of claim 12 wherein the alkaline mother liquor has a pH of 8.85.

* * * * *